Aug. 9, 1938.  A. VODINELICH  2,126,518
COVER FOR COOKING UTENSILS
Filed July 14, 1937  2 Sheets-Sheet 1
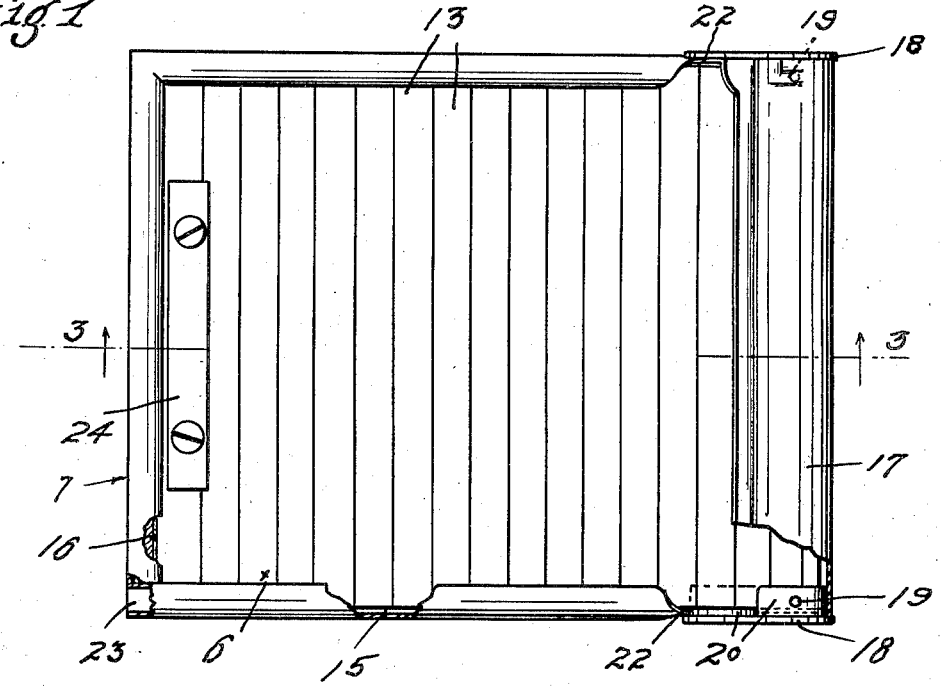
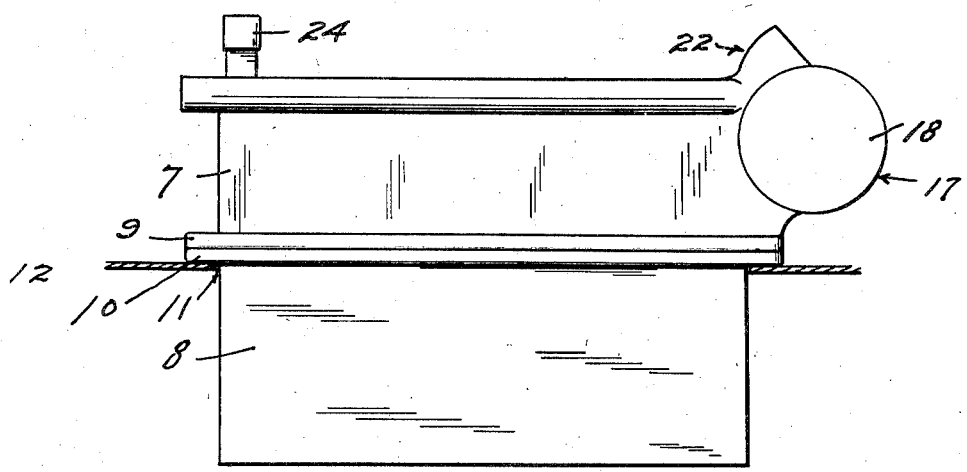
INVENTOR
Anton Vodinelich
By his Attorneys
Merchant & Kilgore Aug. 9, 1938. A. VODINELICH 2,126,518
COVER FOR COOKING UTENSILS
Filed July 14, 1937 2 Sheets-Sheet 2
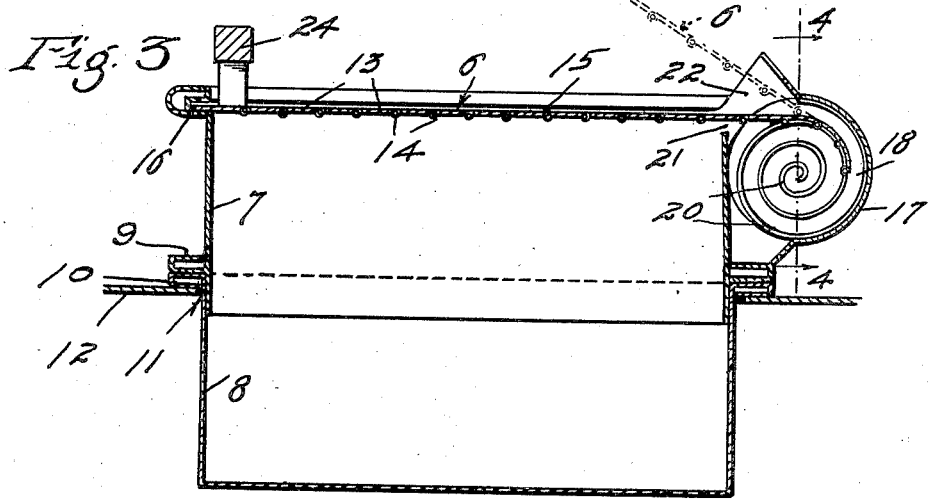
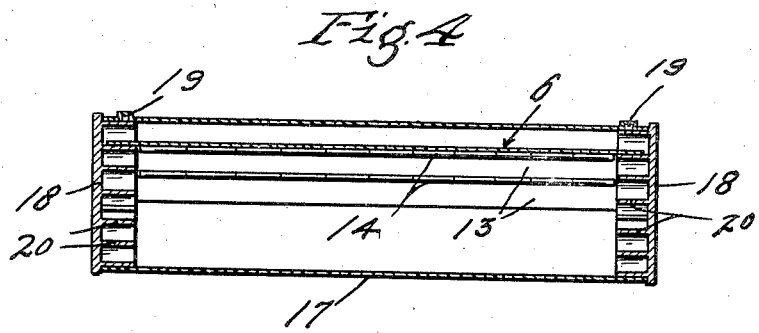
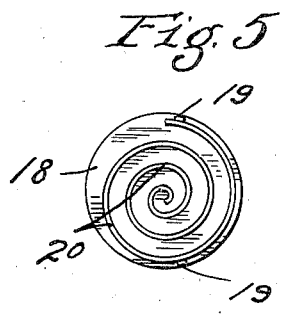
INVENTOR
Anton Vodinelich
By his Attorneys
Merchant & Kilgore Patented Aug. 9, 1938

2,126,518

UNITED STATES PATENT OFFICE 2,126,518

COVER FOR COOKING UTENSILS

Anton Vodinelich, South St. Paul, Minn.

Application July 14, 1937, Serial No. 153,569

4 Claims. (Cl. 53—8)

My invention relates to cooking utensils and more particularly to an improved cover for roasters, frying pans, steam-table receptacles and the like.

It is well known that the present type of cover used in connection with cooking utensils, particularly in hotels and restaurants, is heavy, hard to handle and it is always difficult to find a place to lay the same when removed from the utensil in connection with which it is used.

This invention provides a displaceable cover for cooking utensils that will automatically adjust itself to very compact form during the opening thereof on the utensil. Said invention further provides a housing on the receptacle for the cover when open.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a plan view of the invention with some parts broken away and other parts sectioned;

Fig. 2 is a side elevation of the invention, as shown in Fig. 1;

Fig. 3 is a view principally in section taken on the line 3—3 of Fig. 1;

Fig. 4 is a transverse vertical section taken on the line 4—4 Fig. 3; and

Fig. 5 is a face view of one of the end closures removed from the housing.

The improved cover 6, as shown, is mounted on a rectangular frame 7 which, in turn, is removably mounted on a rectangular pan 8, which forms a depth extension of said pan. The frame 7, at its lower end portion, is telescoped into the pan 8 with a working fit, and has an outstanding intermediate endless flange 9 which rests on the rim 10 of the pan 8, and removably supports its frame 7 therefrom.

The pan 8, as shown, is removably held, suspended through a hole 11 in the top 12 of the steam table by its flange 10 which rests on said top. The top 12 of the steam table is fragmentarily illustrated in section.

The cover 6, as shown, is made up of a plurality of slat-like sections 13, connected the one with the other by hinges 14. The longitudinal edges of the sections 13 abut the one with the other, and form tight joints there-between when the cover 6 is closed. It is important to note that the hinges 14 are on the under side of the cover 6, and which hinges, and the abutting edges of section 13, hold said sections against upward buckling movement during the opening of the cover 6. In the sides of the frame 7, at the top thereof, are ways 15 in which the end portions of the sections 13 are slidably mounted and guide the cover 6 to and from its closed position. These ways 15 also form relatively tight joints between the cover 6 and the frame 7. When the cover 6 is closed its front edge portion projects into a groove-like seat 16, in the front member of the frame 7 and forms a relatively tight joint with said frame.

On the back of the frame 7 is a cylindrical housing 17 for the cover 6 when open, and which housing has open ends normally closed by disk-like caps 18. These caps 18 are detachably secured to the housing 17 by bayonet joints 19. To roll the cover 6, as the same is moved into the housing 17 during the opening thereof, there is provided at each end of said housing a spiral guide 20 fixed to the inner face of the respective cap 18.

The cover 6, during its opening and closing movements, moves through a passageway 21 in the back of the frame 7. Above the passageway 21 is a second passageway 22, through which the cover 6 may be drawn to completely remove the same from the frame 7. To remove the cover 6 from the frame 7, the same is first fully opened and at which time said cover is completely out of the frame 7 and passageway 21. When the cover 6 has been fully opened the front edge portion thereof is lifted above the ways 15 and then pulled forward through the passageway 22.

A handle 24, by which the cover 6 may be manipulated, is attached to the foremost section 13 of said cover.

When the caps 18 are removed from the housing 17 and the cover 6 is removed from frame 7 said parts as well as the frame 7 and housing 17 may be thoroughly cleansed and then reassembled. To facilitate the cleansing of the ways 15, the front ends thereof are open, as indicated at 23 in Fig. 1, whereby a cloth may be drawn therethrough.

From the above description, it is evident that the cover 6 may be easily opened or closed, and when opened is entirely out of the way. In a good many instances, it will not be necessary to fully open the cover, thus preventing splattering of grease or other liquid.

It is, of course, evident that in place of mounting the cover on the frame, as shown, the same may be mounted directly on a roaster, frying pan, or the like.

From the statements made, it will of course be understood that the structure illustrated is capable of various changes within the scope of the invention herein disclosed and claimed.

What I claim is:

1. In a device of the kind described, a horizontally disposed rectangular frame open at its top and bottom and having in its sides channel-like ways, a housing on the rear end of the frame outwardly thereof and having in its ends spiral channels forming continuations of said ways, and a cover comprising slats flexibly connected and mounted in said ways and channels for opening and closing sliding movement.

2. The structure defined in claim 1 in which the frame has, at its front end, a channel connecting the two ways and into which the front end portion of the cover extends when closed.

3. The structure defined in claim 1 in which there are gaps between the rear ends of the ways and the spiral channels through which the cover may be entirely removed from the device.

4. The structure defined in claim 1 in which the ends of the housing are displaceable.

ANTON VODINELICH.